(12) United States Patent
Leone et al.

(10) Patent No.: US 10,202,910 B2
(45) Date of Patent: Feb. 12, 2019

(54) SYSTEM AND METHOD FOR SELECTIVE CYLINDER DEACTIVATION

(71) Applicant: Ford Global Technologies, LLC, Dearborn, MI (US)

(72) Inventors: Thomas G. Leone, Ypsilanti, MI (US); John Eric Rollinger, Troy, MI (US); Mrdjan J. Jankovic, Birmingham, MI (US); Brad Alan Boyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 700 days.

(21) Appl. No.: 14/602,353

(22) Filed: Jan. 22, 2015

(65) Prior Publication Data

US 2016/0003168 A1 Jan. 7, 2016

Related U.S. Application Data

(60) Provisional application No. 62/021,621, filed on Jul. 7, 2014.

(51) Int. Cl.
*F02D 17/02* (2006.01)
*F02D 41/30* (2006.01)
(Continued)

(52) U.S. Cl.
CPC .......... *F02D 17/02* (2013.01); *F02D 35/021* (2013.01); *F02D 41/0087* (2013.01);
(Continued)

(58) Field of Classification Search
CPC .. F02D 41/18; F02D 41/3017; F02D 41/3064; F02D 41/3094; F02D 2041/0012;
(Continued)

(56) References Cited

U.S. PATENT DOCUMENTS 5,460,129 A    10/1995  Miller et al.
5,553,575 A *   9/1996  Beck ...................... F02B 37/16
                                                  123/198 F (Continued)

FOREIGN PATENT DOCUMENTS

JP    2005201074 A  *  7/2005  ......... F02D 41/0087
JP    2006132385 A  *  5/2006
(Continued)

OTHER PUBLICATIONS

Leone, Thomas G. et al., "System and Method for Selective Cylinder Deactivation," U.S. Appl. No. 14/602,395, filed Jan. 22, 2015, 47 pages.
(Continued)

*Primary Examiner* — John Zaleskas
(74) *Attorney, Agent, or Firm* — Julia Voutyras; McCoy Russell LLP

(57) ABSTRACT

Embodiments for operating an engine with skip fire are provided. In one example, a method comprises during a skip fire mode or during a skip fire mode transition, port injecting a first fuel quantity to a cylinder of an engine, the first fuel quantity based on a first, predicted air charge amount for the cylinder and lean of a desired air-fuel ratio, and direct injecting a second fuel quantity to the cylinder, the second fuel quantity based on the first fuel quantity and a second, calculated air charge amount for the cylinder.

23 Claims, 8 Drawing Sheets

(51) Int. Cl.
*F02P 9/00* (2006.01)
*F02D 41/00* (2006.01)
*F02P 5/15* (2006.01)
*F02P 5/152* (2006.01)
*F02D 35/02* (2006.01)
*F02D 41/18* (2006.01)
*F02M 69/04* (2006.01)
*F02P 5/04* (2006.01)
*F02D 37/02* (2006.01)
*F02D 41/38* (2006.01)

(52) U.S. Cl.
CPC ..... *F02D 41/3017* (2013.01); *F02D 41/3094* (2013.01); *F02P 5/1512* (2013.01); *F02P 5/1528* (2013.01); *F02P 9/00* (2013.01); *F02D 37/02* (2013.01); *F02D 41/0007* (2013.01); *F02D 41/18* (2013.01); *F02D 2041/0012* (2013.01); *F02D 2041/389* (2013.01); *F02D 2200/0402* (2013.01); *F02D 2250/12* (2013.01); *F02M 69/046* (2013.01); *F02P 5/045* (2013.01); *Y02T 10/46* (2013.01)

(58) Field of Classification Search
CPC .. F02D 17/02; F02D 13/06; F02D 2200/0402; F02D 35/021; F02M 69/046
USPC ....... 123/198 F, 299, 406.47, 431, 445, 478, 123/480, 481; 701/102, 103, 104
See application file for complete search history.

(56) References Cited

U.S. PATENT DOCUMENTS

| 6,014,955 | A | * | 1/2000 | Hosotani | F02D 41/0002 123/399 |
| 7,918,210 | B2 | | 4/2011 | Gibson et al. | |
| 8,375,920 | B2 | | 2/2013 | Tsukamoto et al. | |
| 2004/0107946 | A1 | * | 6/2004 | Kobayashi | F02D 41/1401 123/480 |
| 2005/0155578 | A1 | * | 7/2005 | Ichise | F02D 41/3094 123/431 |
| 2006/0021422 | A1 | * | 2/2006 | Demura | F02D 35/027 73/35.01 |
| 2008/0120008 | A1 | * | 5/2008 | Russell | F02D 13/06 701/102 |
| 2011/0208405 | A1 | * | 8/2011 | Tripathi | F02D 17/02 701/102 |
| 2011/0213540 | A1 | * | 9/2011 | Tripathi | F02D 37/02 701/102 |
| 2012/0055444 | A1 | * | 3/2012 | Tobergte | F02D 13/06 123/294 |
| 2013/0276749 | A1 | * | 10/2013 | Springer | F02D 17/02 123/349 |
| 2015/0051816 | A1 | * | 2/2015 | Glugla | F02D 41/0055 701/108 |
| 2015/0267634 | A1 | * | 9/2015 | Mashiki | F02D 41/0057 123/295 |
| 2015/0275813 | A1 | * | 10/2015 | Dunn | F02D 41/3094 123/445 |
| 2015/0345407 | A1 | * | 12/2015 | Glugla | F02D 17/02 123/403 |

FOREIGN PATENT DOCUMENTS

| JP | 2007040206 A | * | 2/2007 | ......... F02D 41/0087 |
| JP | 2008075514 A | * | 4/2008 | ......... F02D 41/3094 |
| JP | 2009281275 A | * | 12/2009 | |
| JP | 2010019108 A | * | 1/2010 | |
| JP | 2010196659 A | * | 9/2010 | ......... F02D 41/3029 |

OTHER PUBLICATIONS

Wilcutts, Mark et al., "Design and Benefits of Dynamic Skip Fire Strategies for Cylinder Deactivated Engine," SAE International, 2013-01-0359, published Apr. 8, 2013, 11 pages.

\* cited by examiner

SYSTEM AND METHOD FOR SELECTIVE CYLINDER DEACTIVATION

CROSS REFERENCE TO RELATED APPLICATIONS

The present application claims priority to U.S. Provisional Patent Application No. 62/021,621, "SYSTEM AND METHOD FOR SKIP FIRE," filed on Jul. 7, 2014, the entire contents of which are hereby incorporated by reference for all purposes.

FIELD

The present disclosure relates to skip fire operation in an internal combustion engine.

BACKGROUND AND SUMMARY

In order to improve fuel economy during low load conditions, some engines may be configured to operate in a selective cylinder deactivation mode where one or more cylinders of the engine are deactivated via disabling of intake and/or exhaust valve actuation, interruption of fuel injection, and/or disabling of spark ignition to the deactivated cylinders, for example. During operation in the selective cylinder deactivation mode, also referred to as "skip fire," the total engine fuel amount may be redistributed to the fired cylinders, increasing per-cylinder load and reducing pumping work, thus increasing fuel economy and improving emissions. The cylinder(s) selected for deactivation may change with each engine cycle, such that a different cylinder or combination of cylinders is deactivated per engine cycle. Further, the number of cylinders deactivated per engine cycle may change as engine operating conditions change.

In engines with port fuel injection (PFI) systems, air-fuel ratio control during skip fire may be challenging due to the delay between when the fuel is injected and when the air charge is calculated. Specifically, in PFI systems, fuel for a cylinder is generally injected while that cylinder's intake valve is closed, to provide for desired evaporation and mixing of the fuel. However, the amount of air trapped in that cylinder is determined up to two engine revolutions later, after the intake valve opens and closes again. With a skip fire strategy, the intake manifold dynamics may change dramatically in that time (e.g., the engine may transition into or out of skip fire operation), resulting in a different air charge than originally predicted, and therefore a different air-fuel ratio than desired.

One approach to improving air-fuel ratio control in skip fire engines includes injecting fuel via a direct injection (DI) system, because DI injection can occur much later, when an updated air charge calculation is available. However, the inventors herein have recognized that at part load conditions, PFI offers better efficiency than DI due to improved air-fuel mixing, lower pumping work, and lower fuel pump parasitic losses. Thus, operating with only DI may degrade fuel economy.

In light of the above issues, the inventors herein have devised an approach to maintain the fuel economy benefits of port injection while providing increased air-fuel ratio control during skip fire operation of an engine. In one embodiment, a method comprises, during a skip fire mode, port injecting a first fuel quantity to a cylinder of an engine, the first fuel quantity based on a first, predicted air charge amount for the cylinder and lean of a desired air-fuel ratio, and direct injecting a second fuel quantity to the cylinder, the second fuel quantity based on the first fuel quantity and a second, calculated air charge amount for the cylinder.

In this way, a majority of the fuel provided to the cylinder may be injected via port injection, to provide enhanced fuel vaporization and mixing, and lower pumping work. The amount of fuel injected via the port injection may be deliberately lean of a desired air-fuel ratio, where the desired air-fuel ratio is calculated based on an estimated air charge amount for that cylinder. Then, later in the engine cycle, when the actual amount of trapped air charge in the cylinder can be calculated, an extra amount of fuel may be provided via direct injection to bring the overall air-fuel ratio to the desired air-fuel ratio.

The present disclosure may offer several advantages. For example, by injecting a majority of the fuel via port injection, desired fuel economy may be maintained. By providing a "make-up" injection of fuel later in the engine cycle via direct injection, a desired air-fuel ratio may be maintained, even as intake manifold pressure and charge air flow changes due to operation in the skip fire mode.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
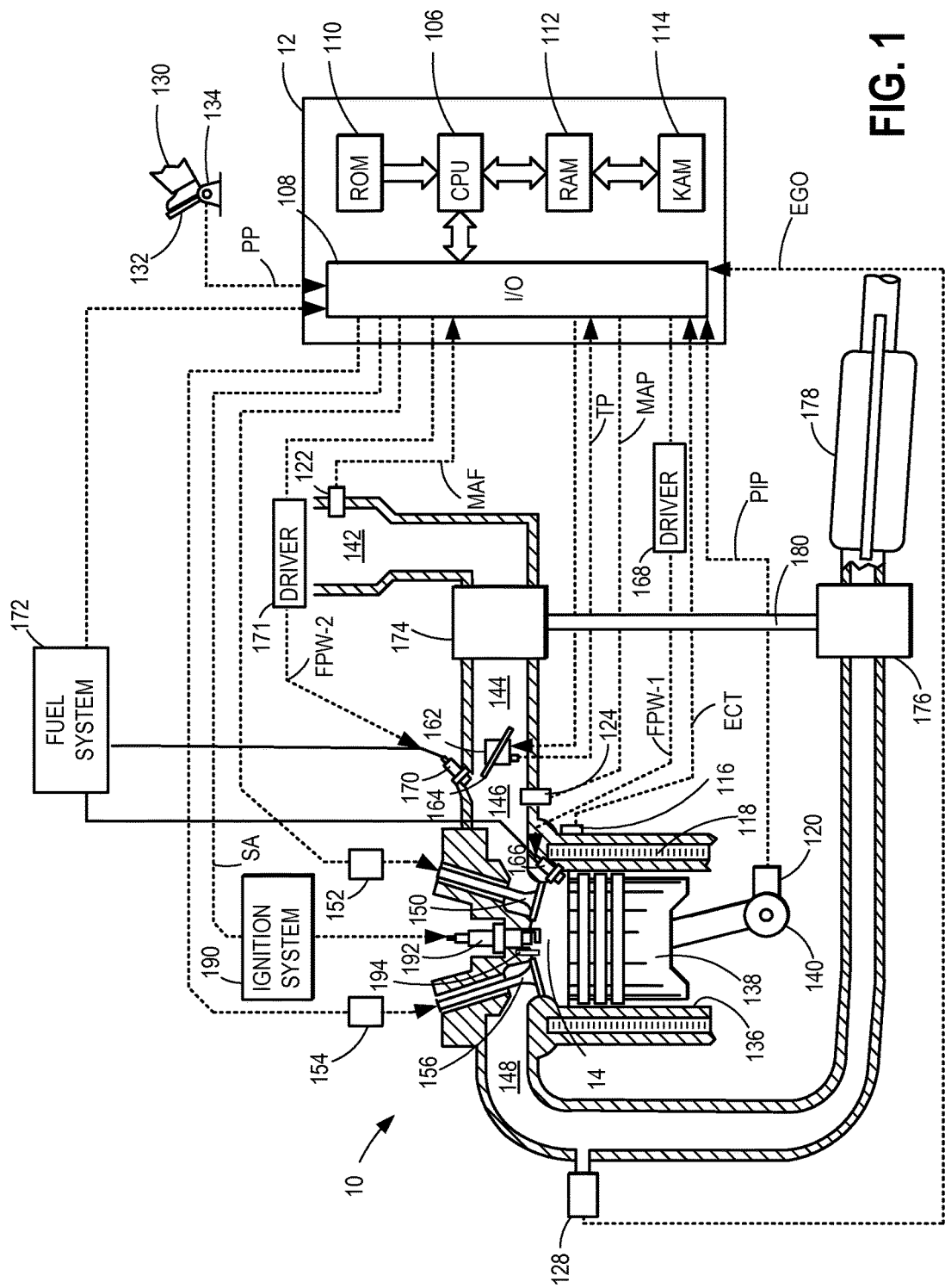
FIG. 1 shows a schematic diagram of a single cylinder of a multi-cylinder engine.
Figure 2:
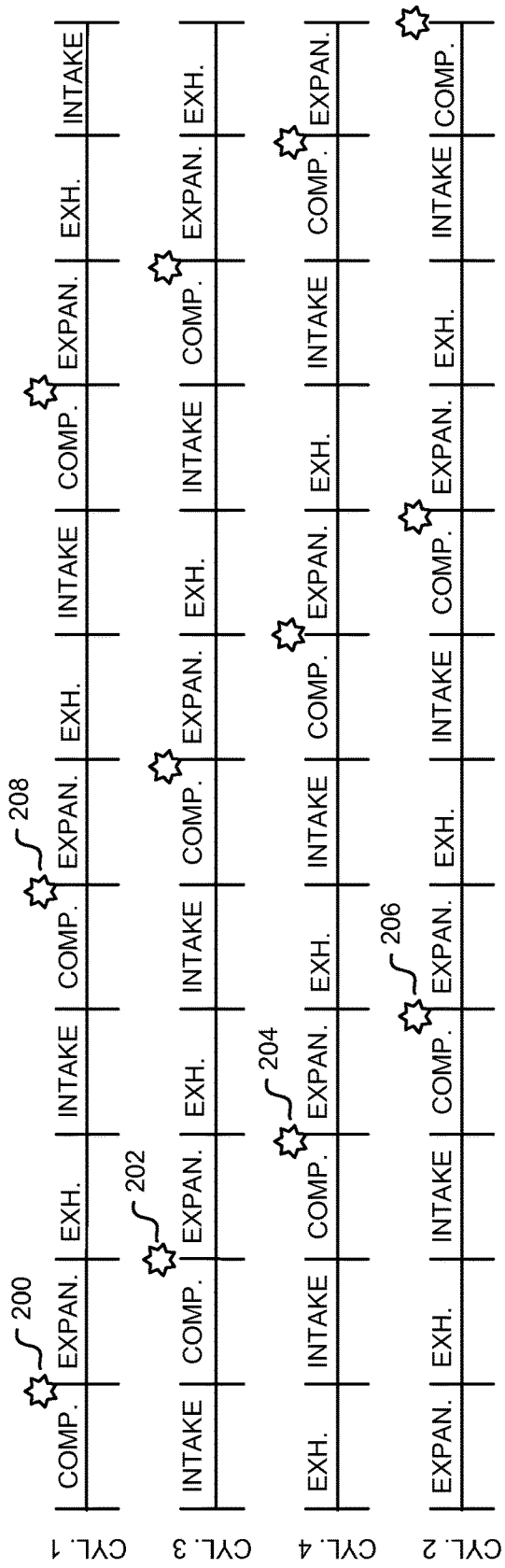
FIG. 2 shows an example cylinder firing plot of an engine operating without skip fire according to an original engine firing order.
Figure 3:
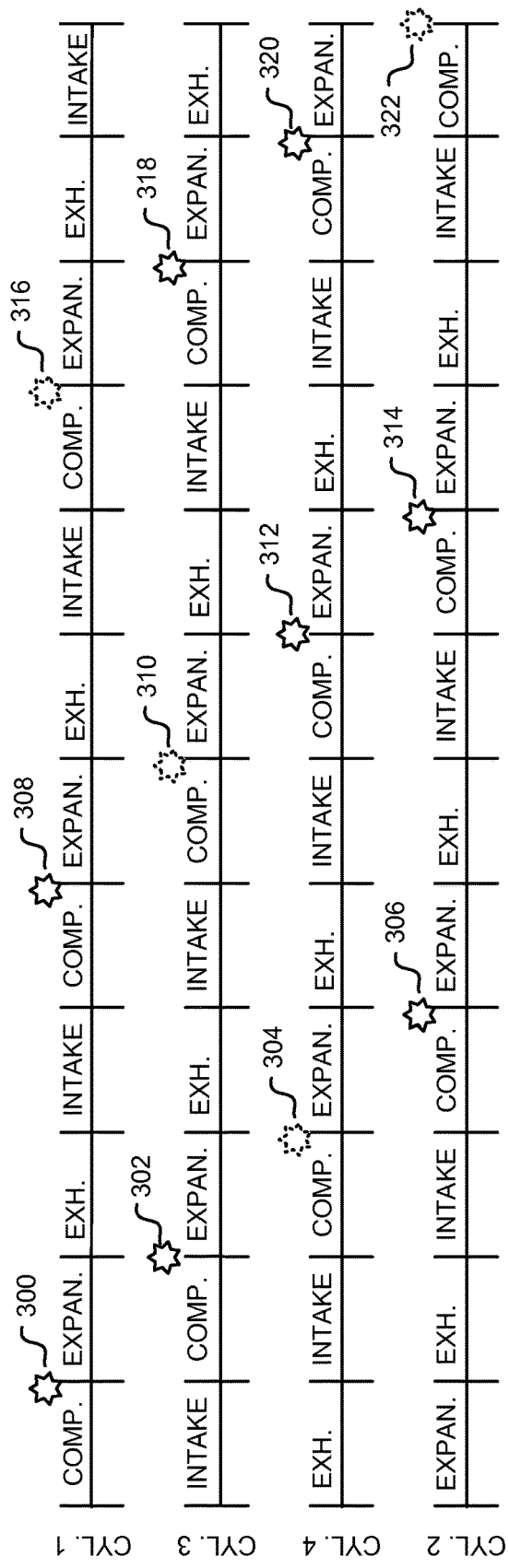
FIG. 3 shows an example cylinder firing plot of an engine operating with skip fire according to a commanded firing order.

Operating an engine with skip fire, where at least one cylinder of the engine is skipped and not fired during each engine cycle, may improve fuel economy and emissions during certain operating conditions, such as low engine load. An engine configured to operate with skip fire is illustrated in FIG. 1, and FIGS. 2-3 illustrate cylinder firing plots for the engine of FIG. 1 in a non-skip fire mode (FIG. 2) and in a skip fire mode (FIG. 3). Additionally, the engine of FIG.

Figure 4:
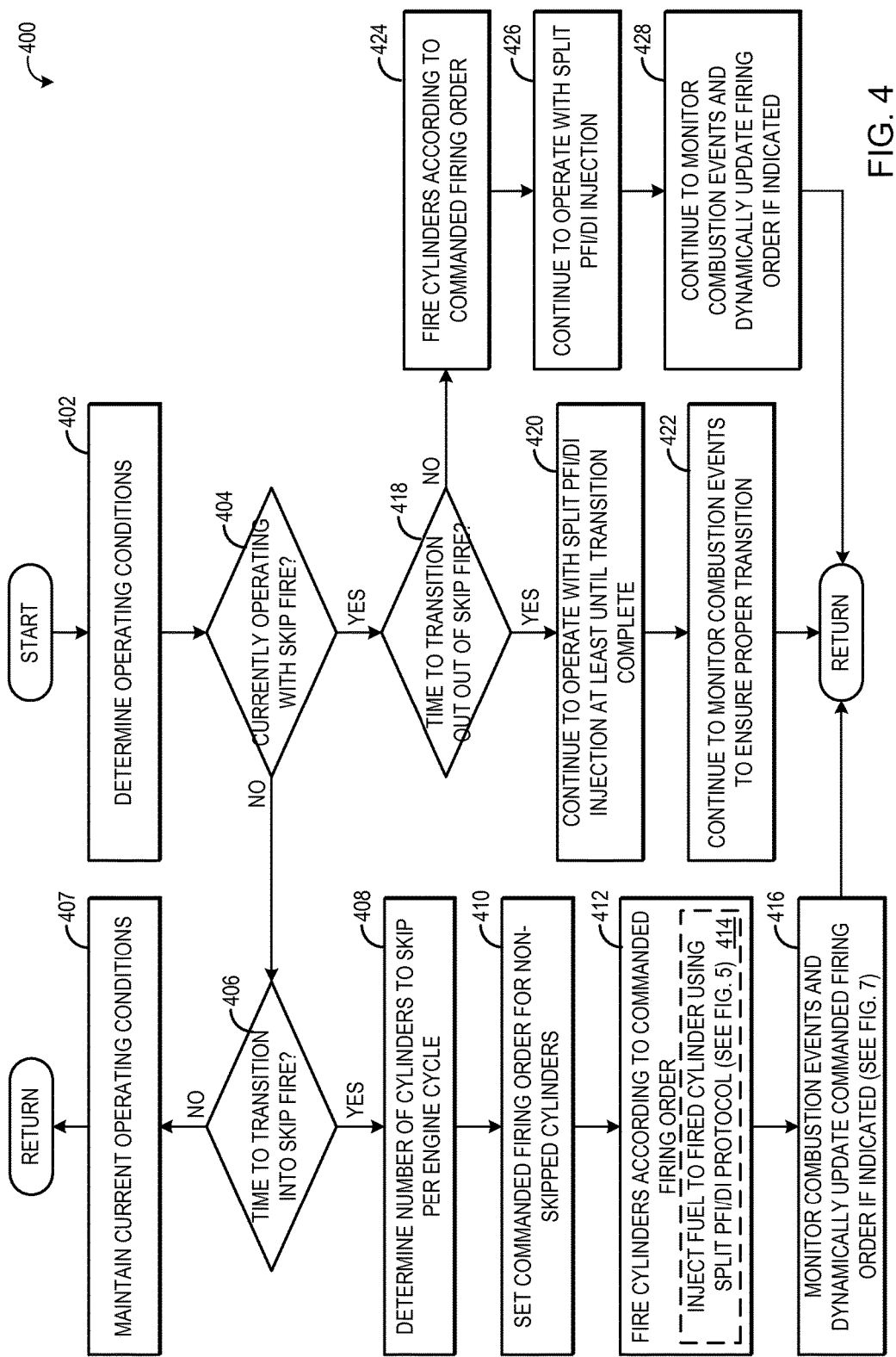
FIG. 4 is a high level flow chart for an engine configured to operate with skip fire.

1 may include a controller to execute one or more methods for carrying out skip fire operation, such as the method illustrated in FIG. 4.

Figure 5:
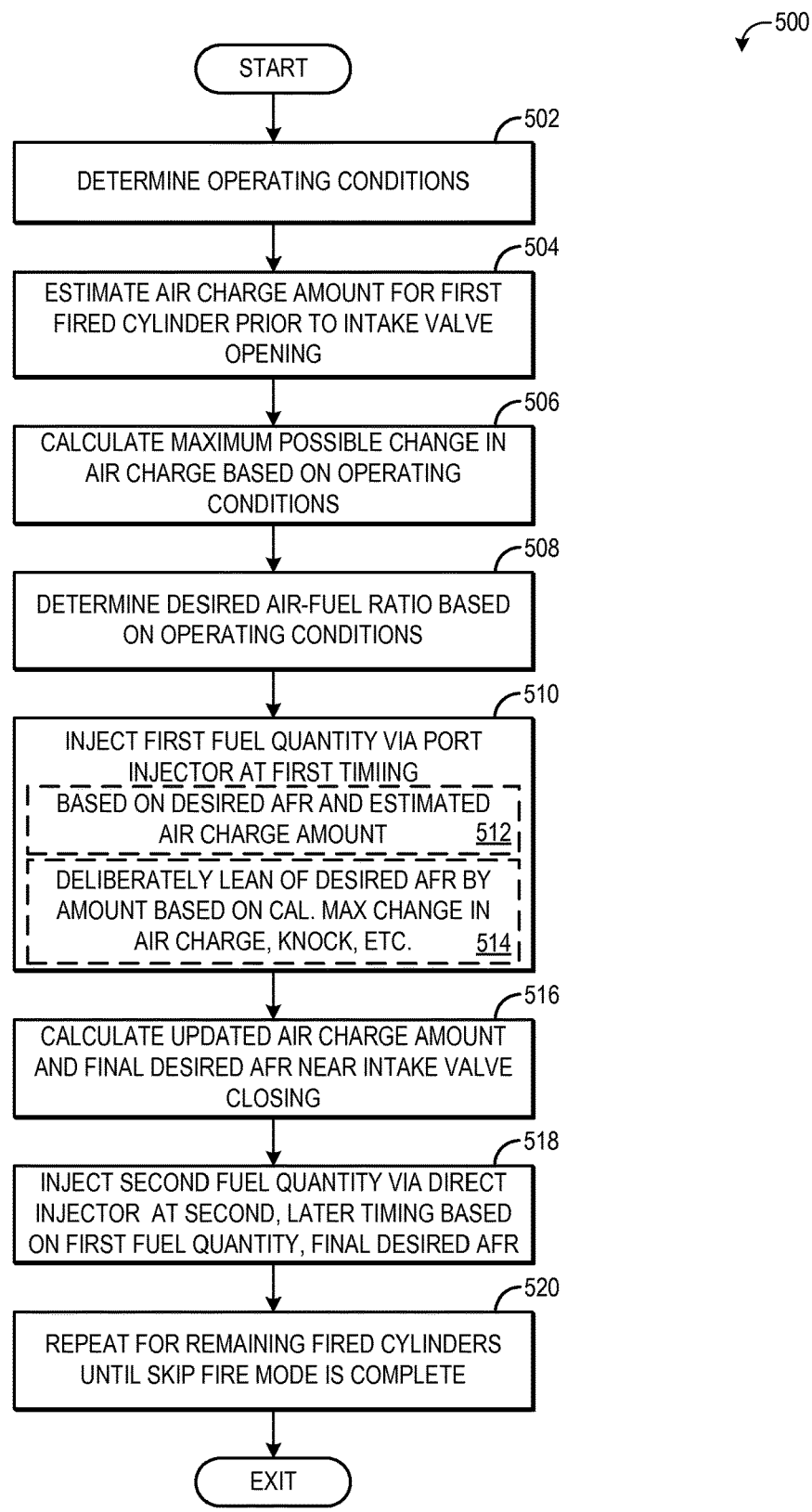
FIG. 5 is a flow chart illustrating a method for adjusting fuel injection during a skip fire mode.
Figure 6:
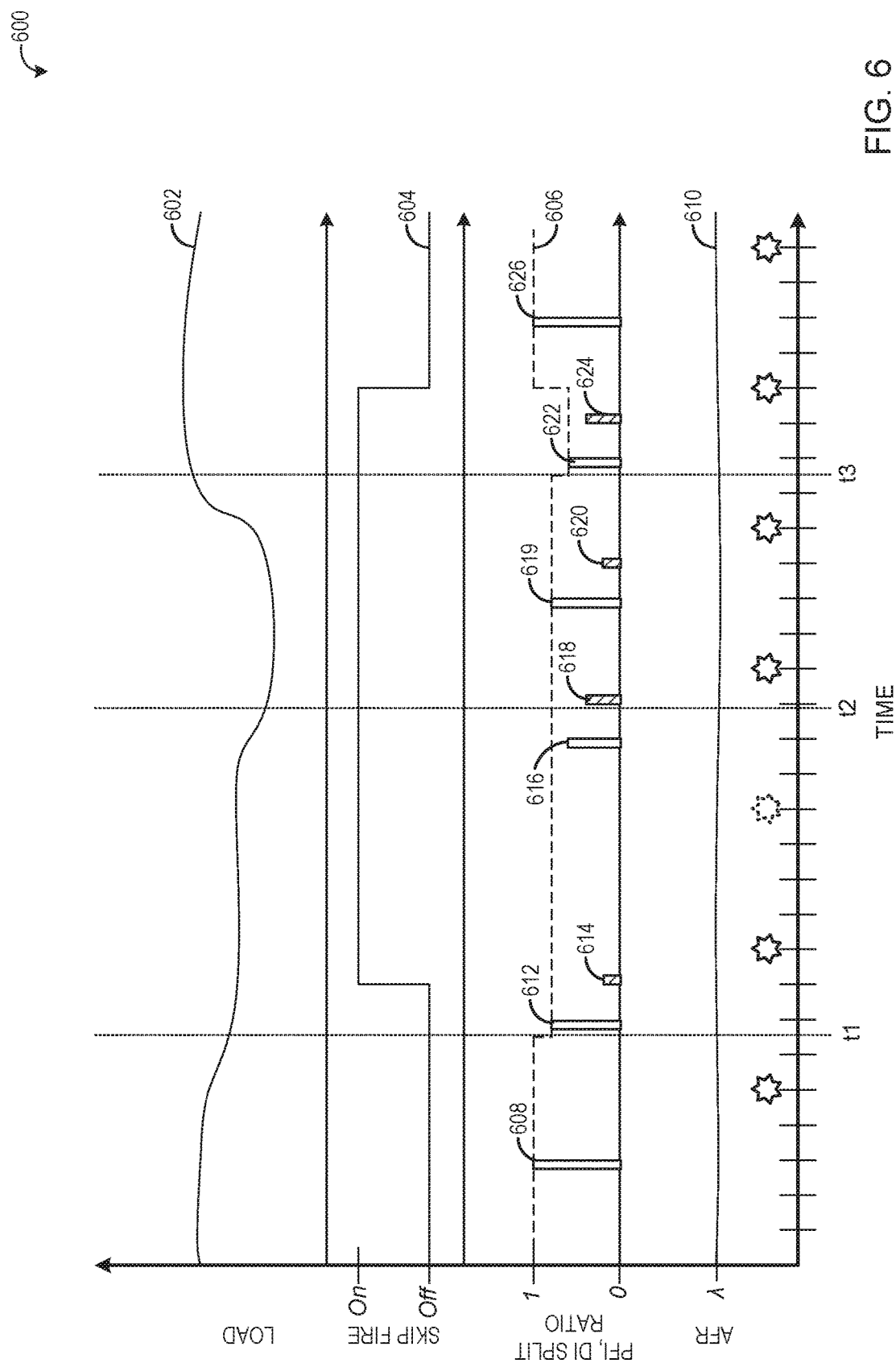
FIG. 6 is an example engine operation plot of an engine operating according to the method of FIG. 5.

During certain periods of skip fire operation, such as during transition into or out of skip fire, intake manifold dynamics may vary, making cylinder air-fuel ratio control difficult, particularly for port fuel injection systems. As described in more detail below, a split injection routine may be executed during skip fire, where some of the fuel is injected via port injection during an earlier portion of the cylinder cycle (when accurate estimation of cylinder air charge is more challenging) and a make-up pulse of fuel is injected via a direct injector during a later portion of the cylinder cycle (when the trapped cylinder air charge is more accurately measured). FIG. 5 illustrates a method for carrying out the split injection routine, while FIG. 6 illustrates example engine operation plots during the execution of FIG. 5.

Figure 7:
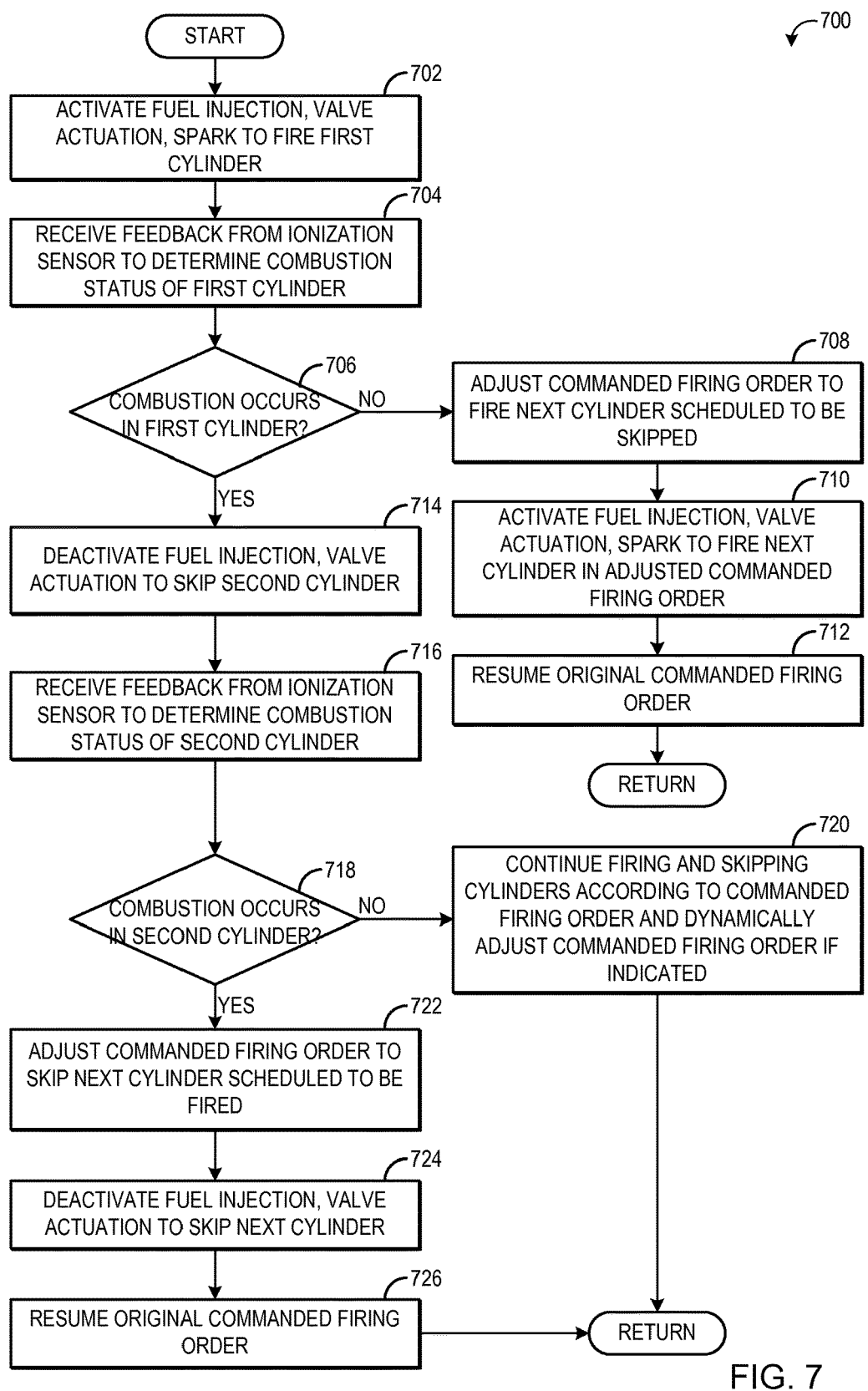
FIG. 7 is a flow chart illustrating a method for sensing combustion events during skip fire.
Figure 8:
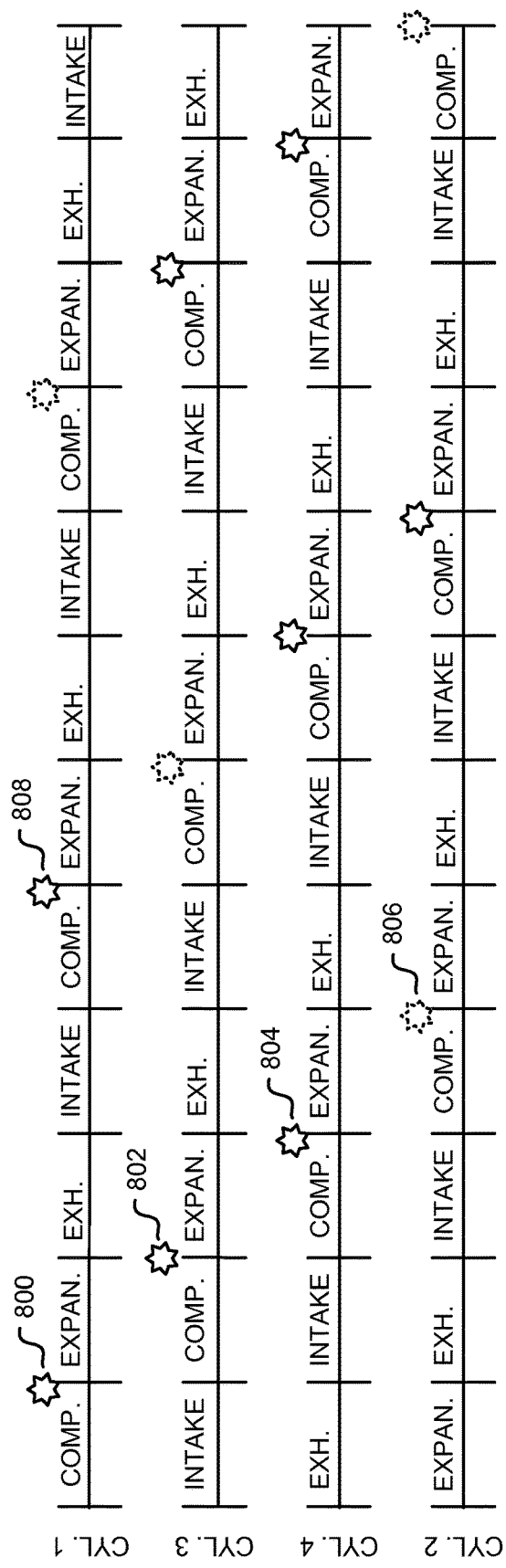
FIG. 8 is an example cylinder firing plot of an engine operating according to the method of FIG. 7.

Further, while some skip fire operation may include deactivation of intake/exhaust valve actuation, fuel injection, and spark ignition, other skip fire operation may maintain spark, even in deactivated cylinders. Additionally, valve deactivation mechanisms may not be fully reliable. During skip fire operation, if fuel vapors are present in the charge air (from a fuel vapor canister purge, for example, or from a positive crankcase ventilation system), and the intake and exhaust valves of a deactivated cylinder are inadvertently actuated, an unintended combustion event in the deactivated cylinder may occur, leading to torque disturbances. To minimize the consequences of unintended cylinder events during skip fire, combustion status may be monitored via ionization sensing, and if an unintended combustion event occurs in a cylinder scheduled to be skipped, the firing order of the engine may be dynamically updated to skip the next cylinder scheduled to be fired, thus maintaining requested torque. FIG. 7 illustrates a method for monitoring combustion during skip fire. FIG. 8 illustrates an example cylinder firing plot including a dynamically updated firing order.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 (otherwise referred to as the intake manifold) can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

During operation, each cylinder within engine 10 typically undergoes a four stroke cycle: the cycle includes the intake stroke, compression stroke, expansion stroke, and exhaust stroke. During the intake stroke, generally, the exhaust valve 156 closes and intake valve 150 opens. Air is introduced into combustion chamber 14 via intake manifold 146, and piston 138 moves to the bottom of the cylinder so as to increase the volume within combustion chamber 14. The position at which piston 138 is near the bottom of the cylinder and at the end of its stroke (e.g., when combustion chamber 30 is at its largest volume) is typically referred to by those of skill in the art as bottom dead center (BDC). During the compression stroke, intake valve 150 and exhaust valve 156 are closed. Piston 138 moves toward the cylinder head so as to compress the air within combustion chamber 14. The point at which piston 138 is at the end of its stroke and closest to the cylinder head (e.g., when combustion chamber 14 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 192, resulting in combustion. During the expansion stroke, the expanding gases push piston 138 back to BDC. Crankshaft 140 converts piston movement into a rotational torque of the rotary shaft. Finally, during the exhaust stroke, the exhaust valve 156 opens to release the combusted air-fuel mixture to exhaust passage 148 and the piston returns to TDC. Note that the above is shown merely as an example, and that intake and exhaust valve opening and/or closing timings may vary, such as to provide positive or negative valve overlap, late intake valve closing, or various other examples.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load and/or knock, as described herein below. The relative distribution of the total injected fuel among injectors 166 and 170 may be referred to as an injection ratio. For example, injecting a larger amount of the fuel for a combustion event via (port) injector 170 may be an example of a higher injection ratio of port to direct injection, while injecting a larger amount of the fuel for a combustion event via (direct) injector 166 may be a lower injection ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation.

Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke, or a combination of some direct injections during the compression stroke and some during the intake stroke.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tank in fuel system 172 may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Further, in some examples, controller 12 may receive a signal from a combustion sensor 194 positioned in the combustion chamber. In one example, combustion sensor 194 may be an ionization sensor that detects the presence of smoke or another indicator of combustion. While a communication line is removed for clarity from FIG. 1, it is to be understood that combustion sensor 194 is operably coupled to and configured to send signals to the controller, similar to the other sensors depicted in FIG. 1.

Storage medium read-only memory 110 can be programmed with computer readable data representing instructions executable by processor 106 for performing the methods described below as well as other variants that are anticipated but not specifically listed. An example routine that may be performed by the controller is described at FIG. 4.

As described above, FIG. 1 shows only one cylinder of a multi-cylinder engine. As such each cylinder may similarly include its own set of intake/exhaust valves, fuel injector(s), spark plug, etc. In some examples, engine 10 may be an inline four-cylinder engine, a V-6 engine, V-8 engine, or other engine configuration.

During standard engine operation, engine 10 is typically operated to fire each cylinder per engine cycle. Thus, for every 720 CA (e.g., two revolutions of the crankshaft), each cylinder will be fired one time. To allow for combustion in each cylinder, each intake and exhaust valve is actuated (e.g., opened) at a specified time. Further, fuel is injected to each cylinder and the spark ignition system provides a spark to each cylinder at a specified time. Accordingly, for each cylinder, the spark ignites the fuel-air mixture to initiate combustion.

FIG. 2 illustrates an example plot of cylinder firing events for an example four cylinder engine (e.g., engine 10 of FIG. 1) during standard, non-skip fire operation. The engine position of each cylinder of the four cylinder engine is described by the traces labeled CYL. 1-4. The vertical markers along the length of traces CYL. 1-4 represent top-dead-center and bottom-dead-center piston positions for the respective cylinders. The respective cylinder strokes of each cylinder are indicated by INTAKE, COMP., EXPAN., and EXH. identifiers.

The engine has an original engine firing order of 1-3-4-2, such that CYL. 1 is fired first, followed by CYL. 3, CYL. 4, and CYL. 2, each engine cycle. Thus, as shown, combustion in CYL. 1 occurs at or near TDC between the compression and expansion strokes, illustrated by star 200. To achieve combustion, fuel is injected to CYL. 1, the intake valve is actuated to drawn in charge air (and is subsequently closed to trap the charge in the cylinder), and combustion is initiated by a spark ignition event. Combustion in CYL. 3 is initiated by a spark, as illustrated by star 202. While CYL. 3 is on a compression stroke, CYL. 1 is on an expansion stroke. Combustion is initiated in CYL. 4 by a spark, as illustrated by star 204. While CYL. 4 is on a compression stroke, CYL. 1 is on an exhaust stroke, and CYL. 3 is on an expansion stroke. Combustion is initiated in CYL. 2 by a spark, as illustrated by star 206. While CYL. 2 is on a compression stroke, CYL. 1 is on an intake stroke, CYL. 3 is on an exhaust stroke, and CYL. 4 is on an expansion stroke. Upon completion of combustion in CYL. 2, a new engine cycle starts and combustion again occurs in CYL. 1, as illustrated by star 208. Combustion then continues according to the engine firing order, as illustrated.

During certain operating conditions, engine 10 may operate in a skip fire mode, where less than all cylinders of the engine are fired each engine cycle. Skip fire mode may be carried out during low load conditions, for example, or other conditions where the per-cylinder fuel quantity to be injected to each cylinder is relatively small (e.g., so small that accurate fuel delivery may be difficult). During skip fire, one or more cylinders of the engine is skipped (e.g., not fired) during each engine cycle. To maintain desired torque, the fuel is redistributed to the fired cylinders, increasing the per-cylinder fuel quantity, thus reducing fueling errors. Skip fire may also reduce pumping losses, increasing engine efficiency.

In order to skip a designated cylinder, the intake and exhaust valves of the designated cylinder are deactivated (via control of the actuators 152 and 154, for example), e.g., the intake and exhaust valves are maintained closed throughout each stroke of the cylinder cycle. In this way, fresh charge is not admitted to the cylinder. Further, fuel injection, via port injector 170 and/or direct injector 166, for example, is disabled. In some examples, spark (from spark plug 192, for example) may be disabled as well. In other examples, spark may be provided to the designated cylinder. However, without charge air and fuel, even with spark, combustion will not occur in the designated cylinder.

FIG. 3 illustrates an example plot of cylinder firing events for an example four cylinder engine (e.g., engine 10 of FIG. 1) during skip fire operation. Similar to FIG. 2, the engine position of each cylinder of the four cylinder engine is described by the traces labeled CYL. 1-4. The vertical markers along the length of traces CYL. 1-4 represent top-dead-center and bottom-dead-center piston positions for the respective cylinders. The respective cylinder strokes of each cylinder are indicated by INTAKE, COMP., EXPAN., and EXH. identifiers.

As explained above, the engine has an original engine firing order of 1-3-4-2. During skip fire, one or more cylinders of the engine are skipped each engine cycle. The number of skipped cylinders may be selected based on operating conditions, such as engine load, as will be explained in more detail below with respect to FIG. 4. Further, a different cylinder may be skipped each engine cycle, such that over a plurality of engine cycles, each cylinder is fired at least once and each cylinder is skipped at least once.

During skip fire, the original engine firing order may be adjusted to achieve a commanded firing order where one or more cylinders are skipped. The commanded firing order may maintain the same basic firing order of the engine, with one or more cylinders skipped each engine cycle, and may alternate skipped cylinders from engine cycle to engine cycle. As shown in FIG. 3, the commanded firing order of the engine during skip fire may fire two cylinders, skip one cylinder, fire two cylinders, skip one cylinder, etc., resulting in a firing order of 1-3-X-2-1-X-4-2-X-3-4-X. In this way, a different cylinder is skipped each time a cylinder is skipped until the pattern repeats.

Thus, as shown, combustion in CYL. 1 occurs at or near TDC between the compression and expansion strokes, illustrated by star 300. Next, combustion in CYL. 3 is initiated by a spark, as illustrated by star 302. CYL. 4, which is scheduled to be fired after CYL. 3 in the original firing order, is skipped. Thus, while a spark may still occur in CYL. 4 during the compression stroke, no combustion is initiated due to the lack of valve actuation and fuel injection, as illustrated by dashed star 304. Combustion in CYL. 2 is initiated by a spark as illustrated by star 306.

During the next engine cycle, combustion occurs in CYL. 1, CYL. 4, and CYL. 2 (as illustrated by star 308, star 312, and star 314, respectively). Combustion does not occur in CYL. 3, as illustrated by dashed star 310. During the following engine cycle, CYLS. 1 and 2 are skipped, as illustrated by dashed stars 316 and 322, respectively, while CYLS. 3 and 4 are fired, as illustrated by stars 318 and 320, respectively. In this way, during some engine cycles, only one cylinder is skipped, while in other engine cycles, more than one cylinder is skipped. However, the commanded firing order as illustrated maintains an even combustion pattern (one cylinder skipped for every two cylinders fired), reducing NVH issues. However, it should be noted that the order and sequence illustrated by FIGS. 2 and 3 are only exemplary in nature and not intended to limit the scope of the description. For example, in some embodiments three cylinders may combust an air-fuel mixture before combustion is skipped in a cylinder. In other embodiments, four cylinders may combust an air-fuel mixture before combustion is skipped in a cylinder. In other embodiments, combustion may be skipped in two cylinders in a row rather than one as depicted by FIG. 3.

Turning now to FIG. 4, a method 400 for operating an engine with skip fire is illustrated. Method 400 may be carried by a controller, such as controller 12 of FIG. 1, according to non-transitory instructions stored thereon, in order to operate engine 10 in a skip fire or non-skip fire mode, as described below.

At 402, method 400 includes determining operating conditions. The operating conditions determined include, but are not limited to, engine load, engine speed, engine fuel demand, and engine temperature. The operating conditions may be determined based on output from one or more engine sensors described above with respect to FIG. 1. At 404, method 400 determines if the engine is currently operating in skip fire, where one or more cylinders of the engine are skipped (e.g., not fired) per engine cycle. If the engine is not currently operating with skip fire, method 400 proceeds to 406 to determine if conditions indicate that skip fire should be initiated. The engine may transition into skip fire operation based on one or a combination of various engine operating parameters. These conditions may include engine speed, fuel demand, and engine load being below predetermined respective thresholds. For example, during idle engine operation, engine speed may be low, such as 500 RPMs, and the engine load may be low. Thus, fuel demand, which is based on speed, load, and operating conditions such as engine temperature, manifold pressure, etc., may be too low to accurately deliver the desired amount of fuel. Additionally, skip fire operation may mitigate problems with cold engine operation, and as such, skip fire operation conditions may be based on engine temperature. Skip fire operation conditions may further be based on the controller sensing the engine being in a steady state operating condition, as transient operating conditions may require a fluctuating fuel demand. Steady state operating conditions may be determined by an amount of time spent at current load, or any suitable method.

If conditions do not indicate that skip fire should be initiated (e.g., if engine load is high), method 400 proceeds to 407 to maintain current operating conditions. The current operating conditions include each cylinder of the engine being fired according to the original engine firing order, with all intake and exhaust valves actuated at appropriate times and fuel injection and spark activated for each cylinder. Method 400 then returns.

If at 406 it is determined that it is time to transition to skip fire operation, method 400 proceeds to 408 to determine the number of cylinders to skip per engine cycle, or per a plurality of engine cycles. That is, a cylinder pattern for selective cylinder deactivation may be determined. The cylinder pattern determined may specify the total number of deactivated cylinders relative to active cylinders, as well the identity of the cylinders to be deactivated. For example, the controller may determine that one cylinder should be skipped every engine cycle, or it may determine that four cylinders should be skipped every three engine cycles, or other appropriate cylinder skip pattern. The total number of cylinders to skip on each engine cycle may be based on operating conditions, such as engine load.

At 410, a commanded firing order for the non-skipped cylinders is set. The commanded firing order may be based on the selected number of cylinders to be skipped per engine cycle, the original engine firing order, and which cylinders were skipped in a previous skip fire engine operation, such that the original firing order is maintained, with the exception of the selected skipped cylinders. The commanded firing order may also ensure that a different cylinder is skipped each time a cylinder is skipped. The commanded firing order described in FIG. 3 is one non-limiting example of a commanded firing order that may be set by the controller for the engine. Therein, a firing order 1-3-4-2-1-3-4-2 of an in-line four cylinder engine is adjusted during skip fire to operate as 1-3-x-2-1-x-4-2. Alternatively, a first set of cylinders may be skipped for a first number of engine cycles while a second set of cylinders are fired, and thereafter the second set of cylinders may be skipped for a second number of engine cycles while the first set of cylinders are fired. This may result in a skip fire pattern of 1-x-4-x-1-x-4-x-x-3-x-2-x-3-x-2-x.

At 412, the cylinders are fired according to the commanded firing order determined in the selected cylinder pattern. As described previously, the fired cylinders have activated valve actuation, fuel injection, and spark, to initiate combustion, while the non-fired cylinders have deactivated valve actuation and deactivated fuel injection (and in some examples, deactivated spark ignition). The fuel provided to the fired cylinders may be provided solely via a port injector, or solely via a direct injector, based on the engine configuration and operating conditions. However, in some examples as indicated at 414, firing the cylinders may optionally include injecting fuel to the fired cylinders using a split PFI/DI injection protocol, which is described in more detail below with respect to FIG. 5. Briefly, during skip fire, the fuel to the fired cylinders may be split between the port injector and the direct injector, to leverage the benefits of port fuel injection with the increased air-fuel ratio control provided by direct injection. A first fuel quantity may be injected to a given cylinder by the port injector, based on a desired air-fuel ratio and an estimated air charge amount for that cylinder, at a first, earlier time in the cylinder cycle (e.g., while the intake valve is closed, prior to the intake stroke). Then, at a second, later time in the cylinder cycle (e.g., just before or after the intake valve closes, before the compression stroke), an updated air charge amount is determined for the cylinder, and a second fuel quantity is injected via the direct injector, based on the updated air charge amount, desired air-fuel ratio, and the first fuel quantity. In this way, overall desired air-fuel ratio may be maintained, even if a load change (which would cause the first estimated air charge amount to differ from the actual trapped air charge amount) occurs between the port injection and direct injection.

Additionally, method 400 may optionally include, at 416, monitoring combustion events and dynamically updating the commanded firing order if indicated, as described in more detail below with respect to FIG. 7. Monitoring the combustion events includes determining if combustion occurs as commanded in cylinders scheduled to fire, as well determining if combustion did not occur as commanded in cylinders scheduled to be skipped, based on ionization sensing (e.g., based on feedback from combustion sensor 194). If an unintended combustion event occurs in a skipped cylinder, or if a planned combustion event does not occur in a cylinder scheduled to be fired, the commanded firing order may be updated to either skip a next cylinder scheduled to be fired or fire a next cylinder scheduled to be skipped. Method 400 then returns.

Returning to 404 of method 400, where it is determined if the engine is currently operating with skip fire, if the answer is yes, method 400 proceeds to 418 to determine if conditions indicate if the controller is to transition out of skip fire. Skip fire may be terminated if engine load increases, for example, if the engine is undergoing a transient event, or other suitable change in operating conditions. If the controller determines it is time to transition out of skip fire, method 400 proceeds to 420 to continue to operate with the PFI/DI split injection protocol at least until the transition is complete, if the engine was being operated with the PFI/DI split injection protocol during skip fire. A completed transition out of skip fire may include, in one example, firing all cylinders for an entire engine cycle. Further, at 422, combustion events may continue to be monitored until the transition out of skip fire is complete. Method 400 then returns.

However, if at 418 it is determined that skip fire operation is to be maintained, method 400 proceeds to 424 to fire the cylinders according to the commanded firing order. If applicable, the engine will continue to operate with the PFI/DI split injection protocol, as indicated at 426, and continue to monitor combustion events and update the firing order, if indicated, as shown at 428. Method 400 then returns.

The PFI/DI split injection protocol described above will not be presented in more detail with respect to FIG. 5, which illustrates a method 500 for adjusting fuel injection during skip fire operation. As explained above, method 500 may be carried out by controller 12, during the execution of method 400 of FIG. 4, to control injection via a port injector (e.g., injector 170) and a direct injector (e.g., injector 166).

At 502, method 500 includes determining engine operating conditions. The determined operating conditions may include engine speed, engine load, MAP, MAF, commanded air-fuel ratio, exhaust air-fuel ratio (determined based on feedback from an exhaust oxygen sensor, such as sensor 128), and other conditions. At 504, a first air charge amount is estimated for a first fired cylinder. The first air charge amount is estimated prior to the intake valve of the first cylinder opening, for example during the exhaust stroke of a previous engine cycle. The air charge amount may be estimated in a suitable manner, such as based on MAP and MAF, and/or other suitable parameters, including boost pressure (if the engine is turbocharged), exhaust gas recirculation rate (both external and internal), intake and exhaust variable cam timing phase angles, and/or engine temperature.

At 506, a maximum possible change in air charge that may occur between when the first air charge amount is estimated and when combustion occurs in the first cylinder is determined based on operating conditions. The maximum possible change in air charge may reflect the possibility that the engine may enter into or exit out of skip fire operation or that the number of skipped cylinders may change, and thus may be based on a change in engine load. For example, the engine load may be decreasing, and thus the maximum possible change in air charge may predict that engine load will keep decreasing over the course of the cylinder cycle, causing a shift in the number of skipped cylinders (e.g., from none to one, or from one to two). Other parameters may also be considered when determining the maximum possible change in air charge amount. For example, an estimate of the maximum change in the air charge in a given cylinder, as a fraction of the current air charge, due to another cylinder being fired versus being skipped may be $V\_cyl/V\_man$, where $V\_cyl$ is cylinder displacement and $V\_man$ is the volume of the intake manifold. In a four-cylinder engine, for example, the maximum change may be ⅛ (12.5%).

At 508, a desired air-fuel ratio is determined based on operating conditions (e.g., speed, load, output from one or more exhaust composition sensors, etc.). At 510, a first fuel quantity is injected via the port injector at a first timing, such as prior to the intake valve opening. As indicated at 512, the first fuel quantity is based on the desired air-fuel ratio and the estimated air charge amount. The first fuel quantity is an amount that is deliberately lean of a fuel quantity needed to reach the desired air-fuel ratio, as indicated at 514. The first fuel quantity may be deliberately lean of the fuel quantity needed to reach the desired air-fuel ratio by an amount based on the maximum possible change in air charge determined at 506. For example, if the maximum possible change in the air charge between the first, estimated air charge amount and the actual air charge trapped in the first cylinder at combustion is a negative value (e.g., indicates that the estimated air charge is likely to be greater than the actual air charge amount), the first fuel quantity may be lean of the fuel quantity needed to reach the desired air-fuel ratio by a first, larger amount. If the maximum possible change in air charge is a positive value (e.g., indicates that the estimated air charge is likely to be less than the actual air charge amount), the first fuel quantity may be lean of the fuel quantity needed to reach the desired air-fuel ratio by a second, smaller amount. In this way, if the controller predicts the air charge amount is likely to increase, the first fuel quantity may be larger than if the controller predicts the air charge amount is likely to decrease. Further, in some examples, the first fuel quantity may be decreased below the amount needed to reach the desired air-fuel ratio based on other parameters, such as knock, NVH issues, etc.

At 516, a second, updated air charge amount is calculated and a final desired air-fuel ratio is determined based on operating conditions, at a later time in the cylinder cycle, such as near intake valve closing. Due to the relatively long amount of elapsed time between when the first air charge amount is calculated (before intake valve opening, prior to port injection) and when the updated air charge amount is calculated (at intake valve closing, prior to direct injection), engine operating conditions may change that affect intake manifold dynamics and ultimately change the amount of charge air that is trapped in the cylinder once the intake valve closes. Such operating conditions may include transition into or out of skip fire operation or adjustment to the number of skipped cylinders. To compensate for the changed air charge amount, a second, "make-up" pulse of fuel is injected via the direct injector. As indicated at 518, a second fuel quantity is injected via a direct injector at a second, later timing, where the second fuel quantity is an amount based on the first fuel quantity, updated air charge amount, and final desired air-fuel ratio.

In one example, the first estimated air charge amount and second, updated air charge amount may be equal. In this case, the second fuel quantity injected by the direct injector is equal to the amount of fuel needed to bring the cylinder to the first desired air-fuel ratio, minus the first fuel quantity. In other words, the "deliberate leanness" of the first fuel quantity is simply made up by the second fuel quantity. In another example, the first estimated air charge amount may be less than the second, updated air charge amount. In this case, the second fuel quantity may be an amount that includes the "deliberate leanness" of the first fuel quantity (e.g., the amount added to the first fuel quantity in order to reach the desired air-fuel ratio), plus an additional amount of fuel to compensate for the increased amount of charge air. In a still further example, the first estimated air charge amount may be greater than the second, updated air charge amount. In this case, the second fuel quantity may be an amount that is less than "deliberate leanness" of the first fuel quantity to compensate for the decreased amount of charge air. In all the above examples, the final desired air-fuel ratio is reached at combustion.

At 520, the PFI/DI split injection is repeated for all fired cylinders until the skip fire mode (and transition out of the skip fire mode) is complete. Method 500 then returns.

FIG. 6 is a diagram 600 illustrating a plurality of example engine operational plots that may be produced during the execution of method 500. Specifically, diagram 600 includes a load plot, a skip fire status plot, a PFI and DI split ratio plot (which also illustrates the fuel injected via PFI as a proportion of the fuel needed to reach the desired air-fuel ratio at the time of the first air charge estimate), and air-fuel ratio plot. For each plot, time is depicted along the horizontal axis, and each respective operating parameter is depicted along the vertical axis. For the skip fire status plot, a binary on/off status is depicted. For the PFI and DI split ratio plot, the relative proportion of fuel injected by each injector is depicted per injection event for a single cylinder (e.g., cylinder 1, according to the firing order of FIG. 3), not absolute amounts of fuel. As such, the PFI and DI split ratio plot depicts a range of relative ratios, from 0 to 1, where if all the fuel is injected via the port injector, the PFI split ratio is 1 and the DI split ratio is zero, and vice versa. As mentioned above, the fuel injection events for one cylinder are illustrated. These events correspond in time to the cylinder strokes for that cylinder, represented by the hatch marks along the horizontal axis, along with combustion events, represented by the stars also along the horizontal axis. For the PFI injected/commanded for AFR curve, the proportion of injected fuel vs. fuel needed to reach the desired air-fuel ratio is depicted as a proportion in a range from 0-1.

Prior to time t1, the engine is operating with mid-to-high engine load, as illustrated by curve 602, and thus skip fire is off (as combustion in all cylinders is needed to deliver the requested torque), as illustrated by curve 604. All the fuel is injected via the port injector, and as such the proportion of PFI fuel to reach the desired AFR actually injected via PFI is 1, as illustrated by curve 606. Accordingly, the PFI split ratio is one (illustrated by injection event 608) and the DI split ratio is zero. Air-fuel ratio is maintained around a desired air-fuel ratio of stoichiometry, as illustrated by curve 610.

Just prior to time t1, engine load starts to drop. As such, the controller beings to initiate a transition into skip fire operation at time t1. During the transition into skip fire, MAP, MAF, and other intake manifold and charge air parameters may change as the number of fired cylinders decreases. To compensate for a possible transition into skip fire mode, at time t1, the controller initiates the PFI/DI split injection protocol described above with respect to FIG. 5. As a result, the fuel quantity injected by the port injector is decreased, e.g., the air-fuel ratio is temporarily made deliberately lean. For example, rather than delivering 100% of the fuel needed to reach the desired air-fuel ratio, 90% of the fuel needed to reach the desired air-fuel ratio may be delivered via port injection. Then, later in the cylinder cycle, the direct injector injects a make-up pulse to reach the desired air-fuel ratio. Accordingly, the PFI split ratio decreases while the DI split ratio increases. The decreased quantity of fuel injected by the port injector may be based on anticipated changes to the air charge, from the transition into skip fire, for example, and/or from the decreasing engine load.

Thus, as illustrated in FIG. 6, for the second firing event of cylinder 1, a port injection event 612 occurs immediately after time t1. The port injection event 612 is less than the entire amount of fuel needed to reach the desired air-fuel ratio, due to an anticipated change in air charge between the port injection event and when the intake valve is closed (and thus the air charge amount in the cylinder is set). Then, at direct injection event 614, the rest of the fuel needed to reach the desired air-fuel ratio, based on the updated air charge amount, is provided.

Skip fire operation begins between injection event 612 and injection event 614. That is, during the first firing event following time t1, the engine starts to skip fire. As such, during the course of firing cylinder 1 (e.g., at a time between intake valve opening and closing), a cylinder originally scheduled to be fired is instead skipped (such as cylinder 4, according to the firing order illustrated in FIG. 3). The skipping of this cylinder results in an increase in the actual air charge as compared to the air charge estimated, and thus an additional amount of fuel is injected via the direct injection event to maintain air-fuel ratio, even as air charge changes over the course of the cylinder cycle for cylinder 1. The next scheduled firing event for cylinder 1 is a skip fire event, where cylinder 1 is not fired, as illustrated by the dashed star.

Prior to time t2, the engine load decreases again. This decreasing engine load may cause a change to the maximum possible change in air flow, as the controller may anticipate a shift in the number of skipped cylinders (e.g., the number of skipped cylinders may increase). This increase in the number of skipped cylinders may cause a reduction in the amount of actual charge air trapped in the cylinder 1, and so the relative proportion of fuel injected by the port injector decreases, as shown by injection event 616, and the relative proportion of the fuel injected by the direct injector increases, as illustrated by injection event 618. In some examples, the switch from skipping one to skipping two cylinders may cause a greater air flow disturbance than the switch from skipping no cylinders to skipping one cylinder, and thus the relative proportion of fuel injected by the port injector may be less around time t2 than the proportion of fuel injected by the port injector around time t1.

Following time t2, engine load stabilizes and the PFI split ratio increases (and the DI split ratio decreases) slightly due to the stabilized engine conditions (for example, the maximum possible change in charge air may be smaller if the load remains steady). This is illustrated by injection event 619 and injection event 620.

The engine load increases again prior to time t3, relatively rapidly. Due to the increasing engine load, the controller may predict a transition out of skip fire operation. During a transition out of skip fire, the difference between the estimated air charge and the actual air charge may be a negative value, as the air charge may decrease following the reactivation of all the cylinders. As such, the amount of fuel injected by PFI, as a proportion of the fuel needed to reach the desired air-fuel ratio, illustrated by curve 606, may decrease. This is because the total amount of fuel needed to maintain the desired air-fuel ratio, after the transition out of skip fire, may be low, and thus to avoid an over-fueling event, the fuel quantity injected by the port injector may be made even lower than the previous injection events, as demonstrated by the injection event 622. However, because the engine does not actually transition out of skip fire, the air charge amount does not change as anticipated, and thus a relatively large amount of fuel is injected via the direct injector, as illustrated by injection event 624. After the cylinder firing event following time t3, skip operation is terminated. Once termination is complete, the PFI ratio returns to one, as shown by injection event 626.

It is to be understood that the cylinder firing events illustrated in FIG. 6, including the combustion events and fuel injection events, are illustrative in nature, and not meant to be limiting. Other configurations are possible. For example, multiple firing events for cylinder 1 may occur between the illustrated firing events, including skipped firing events, in order to maintain an established firing order. In particular, additional firing events may occur between the firing event before time t3 and the firing event after time t3, or the firing order of the engine may change, for example due to the additional number of skipped cylinders following the load drop at time t2.

Thus, the description above with respect to FIGS. 5 and 6 discloses "make-up" pulses of fuel that may be injected after the main fuel injection event, to compensate for air flow changes that may occur between when port injection occurs (before intake valve opening) and when direct injection occurs (after the intake valve opens and near intake valve closing). However, such an approach relies on a port injector and a direct injector, which may be costly to install and complicated to control. Thus, a more cost-effective mechanism for compensating for air flow changes during skip fire includes using only port injection and compensating for air charge changes during a subsequent firing event. For example, if there is a deviation between a first, predicted air charge, determined at the time of the port injection of a first cylinder, and an air charge calculated later during the cylinder cycle (such as at intake valve closing, when the actual air charge can be determined), additional fuel may be injected during the port injection of a second cylinder that follows the first cylinder in the engine firing order.

In this way, the proper amount of fuel for reaching a desired air-flow ratio, based on the first predicted air charge amount, can be injected to the first cylinder (e.g., the amount injected to the first cylinder will not be made purposely lean). Then, if the actual air charge admitted to the first cylinder is different than the predicted air charge amount, the amount of fuel injected to the second cylinder can be increased or decreased accordingly, so that overall engine air-fuel ratio remains steady. The first and second cylinders may be on the same cylinder bank and/or plumbed to the same catalyst to ensure that the exhaust air-fuel ratio and the catalyst remains at the desired air-fuel ratio.

Turning now to FIG. 7, a method 700 for sensing combustion events during skip fire is illustrated. Method 700 may be carried out as part of method 400, as explained above, according to instructions stored on controller 12 in order to maintain a set number of skipped cylinders of engine 10, even in the event of unintended combustion or skip events during skip fire operation. It is to be understood that method 700 is executed after skip fire operation has commenced, for example after setting a commanded firing order that includes firing at least a first cylinder and skipping at least a second cylinder. Method 700 includes, at 702, activating fuel injection, valve actuation, and spark ignition to fire the first cylinder. At 704, feedback from one or more ionization sensors is received to determine the combustion status of the first cylinder, following spark. For example, the first cylinder may include an ionization sensor (such as sensor 194) that detects the presence of smoke or other combustion products. As such, feedback from the ionization sensor may indicate if combustion did or did not occur in the cylinder follow spark.

At 706, method 700 includes determining if combustion occurred in the first cylinder, based on the feedback from the ionization sensor. If combustion did not occur, method 700 proceeds to 708 to adjust the commanded firing order to fire a next cylinder scheduled to be skipped in the commanded firing order. At 710, fuel injection, valve actuation, and spark are activated to fire the next cylinder. At 712, after the next cylinder is fired (based on feedback from the ionization sensor, for example), the original commanded firing order is resumed, and then method 700 returns.

However, if combustion does occur as scheduled in the first cylinder at 706, method 700 proceeds to 714 to deactivate fuel injection and valve actuation to skip the second cylinder (e.g., the cylinder scheduled to be skipped in the commanded firing order). While some engine configurations may also disable spark during skipping of a cylinder, other engine configurations may maintain spark even to skipped cylinders. At 716, feedback is received from an ionization sensor (e.g., an ionization sensor of the second cylinder) to determine the combustion status of the second cylinder.

At 718, method 700 includes determining if combustion occurred in the second cylinder. If combustion did not occur, and the second cylinder was skipped as scheduled, method 700 proceeds to 720 continue firing and skipping cylinders according to the commanded firing order and dynamically adjusting the commanded firing order if indicated, for example in response to an unintended combustion or skip event. Method 700 then returns.

If at 718 it is instead determined that combustion did occur in the second cylinder, method 700 proceeds to 722 to adjust the commanded firing order to skip the next cylinder scheduled to be fired. At 724, fuel injection and valve actuation are deactivated to skip the next cylinder. At 726, after the next cylinder has been skipped, the original commanded firing order is resumed, and method 700 returns.

Thus, method 700 provides for firing and skipping cylinders according to a commanded firing order of the engine during a skip fire operation. For each cylinder, whether the cylinder is scheduled to be fired or scheduled to be skipped, the combustion status of the cylinder is monitored via ionization sensing. For example, spark ignition, and hence combustion, typically occur at some time in the late compression stroke or early expansion stroke. Thus, the feedback from the one or more ionization sensors may be collected and monitored during the compression and expansion strokes for each cylinder, at each engine cycle. If combustion occurs in a cylinder scheduled to be skipped, the commanded firing order of the engine is updated to skip the next cylinder in the firing order scheduled to be fired, thus maintaining the correct number of skipped cylinders and maintaining torque. Similarly, if combustion does not occur in a cylinder scheduled to be fired, the next cylinder in the firing order scheduled to be skipped may instead be fired. While the above examples adjust the firing status of the next cylinder in the firing order if an unintended combustion event or skip event is detected, in some circumstances a later cylinder in the firing order may be adjusted, to balance the firing order of the engine and prevent NVH issues, for example.

FIG. 8 illustrates example firing events for cylinders of an engine according to the method of FIG. 7. The cylinder firing plots of FIG. 8 are similar to the firing plots of FIGS. 2-3. As such, the same original engine firing order (1-3-4-2) and commanded firing order during skip fire (skip one cylinder for every two cylinders fired) apply. Thus, a first combustion event occurs in CYL. 1, illustrated by star 800, and a second combustion event occurs in CYL. 3, illustrated by star 802. According to the commanded firing order of the engine, CYL. 4 is scheduled to be skipped. However, an unintended combustion event occurs in CYL. 4, as illustrated by star 804. To compensate, the next cylinder scheduled to be fired, CYL. 2, is instead skipped, as shown by dashed star 806. The commanded firing order then resumes with a combustion event in CYL. 1 (star 808) and so forth.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    during a non-skip fire mode where all engine cylinders are fired,
        port injecting all fuel for combustion into each engine cylinder and not direct injecting fuel; and
    during a transition into a skip fire mode from the non-skip fire mode,
        port injecting a first fuel quantity of a fuel to a first engine cylinder, the first fuel quantity based on a first, predicted air charge amount for the first engine cylinder and lean of a desired air-fuel ratio;
        direct injecting a second fuel quantity of the fuel to the first engine cylinder, the second fuel quantity based on the first fuel quantity and a second air charge amount for the first engine cylinder; and
        after port injecting the first fuel quantity, during firing the first engine cylinder, skipping firing of a second engine cylinder.

2. The method of claim 1, wherein the first fuel quantity is lean of the desired air-fuel ratio by an amount corresponding to a maximum possible deviation from the first, predicted air charge amount for current engine operating conditions between when the first, predicted air charge amount is estimated and when combustion occurs in the first engine cylinder.

3. The method of claim 1, wherein direct injection of the second fuel quantity occurs after port injection of the first fuel quantity, wherein the first fuel quantity is greater than the second fuel quantity and a majority of fuel provided to the first engine cylinder, wherein the first fuel quantity is injected prior to intake valve opening and the second fuel quantity is injected near intake valve closing, after the injection of the first fuel quantity, and wherein the second air charge amount is an updated estimate of the air charge amount for the first engine cylinder determined later in an engine cycle than the first, predicted air charge amount and after intake valve closing.

4. The method of claim 1, wherein skipping firing of the second engine cylinder occurs between port injecting the first quantity of the fuel and direct injecting the second quantity of the fuel to the first engine cylinder.

5. The method of claim 1, wherein port injecting the first fuel quantity and direct injecting the second fuel quantity to the first engine cylinder during the transition into the skip fire mode occurs prior to not firing the second engine cylinder and wherein port injecting the first fuel quantity to the first engine cylinder includes decreasing a port injection amount relative to a port injection amount injected during port injecting during the non-skip fire mode.

6. The method of claim 1, wherein the transition into the skip fire mode includes a transition from firing all engine cylinders, including the first engine cylinder and the second engine cylinder, to firing only a subset of the engine cylinders of an engine, including the first engine cylinder and further comprising switching from port injecting all fuel for combustion into each engine cylinder to a port fuel injection/direct injection split injection protocol including port injecting the first fuel quantity and direct injecting the second fuel quantity during the transition into the skip fire mode, prior to skipping firing of the second engine cylinder.

7. The method of claim 6, further comprising, during a transition out of the skip fire mode, where the engine transitions from firing only the subset of engine cylinders of the engine, including the first engine cylinder, to firing all engine cylinders of the engine, including the first engine cylinder and the second engine cylinder, continuing the port fuel injection/direct injection split injection protocol for each engine cylinder and firing all engine cylinders for an entire engine cycle, and further comprising, after firing all the engine cylinders for the entire engine cycle, ending the skip fire mode and port injecting all fuel for combustion into each engine cylinder and not direct injecting fuel.

8. The method of claim 1, wherein the first, predicted air charge amount is an air charge amount for the first engine cylinder predicted prior to intake valve opening, and wherein the second air charge amount is an air charge amount for the first engine cylinder calculated at intake valve closing.

9. The method of claim 8, wherein the desired air-fuel ratio is a first desired air-fuel ratio calculated based on the first, predicted air charge amount, and wherein direct injecting the second fuel quantity to the first engine cylinder comprises direct injecting the second fuel quantity to bring an overall cylinder air-fuel ratio to a second desired air-fuel ratio, the second desired air-fuel ratio calculated based on the second air charge amount.

10. The method of claim 1, wherein the first engine cylinder is a first cylinder scheduled to be fired in a commanded firing order of an engine, and further comprising:
determining if combustion occurred in the first engine cylinder based on feedback from an ionization sensor; and
if combustion does not occur in the first engine cylinder as commanded, adjusting the commanded firing order of the engine to fire a third engine cylinder, the third engine cylinder originally scheduled to be skipped in the commanded firing order.

11. The method of claim 1, wherein the first engine cylinder and the second engine cylinder are included in a plurality of cylinders of an engine; further comprising initiating combustion in the second engine cylinder via a spark ignition system, the spark ignition system including one or more ionization sensors to detect occurrence of combustion events in the plurality of cylinders; further comprising, via a controller, determining a commanded firing order during the skip fire mode; and further comprising, during firing of the second engine cylinder, activating a port fuel injection system of the engine to port inject the first fuel quantity to the second engine cylinder during a first, earlier portion of an engine cycle, activating a direct fuel injection system of the engine to direct inject the second fuel quantity to the second engine cylinder during a second, later portion of the engine cycle, and activating the spark ignition system to initiate combustion in the second engine cylinder, where the desired air-fuel ratio is a first desired air-fuel ratio that is based on the first, predicted air charge amount, and where direct injecting the second fuel quantity brings an overall air-fuel ratio for the second engine cylinder to a second, desired air-fuel ratio for the second engine cylinder, the second desired air-fuel ratio based on the second air charge amount, where the second air charge amount is an updated air charge amount for the second engine cylinder.

12. The method of claim 11, further comprising:
determining if combustion occurred in the second engine cylinder via feedback from the one or more ionization sensors;
if combustion does not occur in the second engine cylinder, adjusting the commanded firing order to fire the first engine cylinder; and
if combustion does occur in the second engine cylinder, maintaining the commanded firing order to skip the first engine cylinder.

13. The method of claim 12, wherein the commanded firing order is based on an original firing order of the engine in a non-skip fire mode, a number of cylinders to be skipped during the skip fire mode, and which cylinders of the plurality of cylinders were fired in a previous engine cycle, where the number of cylinders to be skipped is based on engine load.

14. A method, comprising:
during a transition into a skip fire mode from a non-skip fire mode,
determining a first air charge amount for a first engine cylinder and a desired air-fuel ratio based on engine operating conditions prior to opening of an intake valve of the first engine cylinder;
injecting a first fuel quantity of a fuel to the first engine cylinder, the first fuel quantity based on the determined first air charge amount for the first engine cylinder and the desired air-fuel ratio;
after injecting the first fuel quantity of the fuel, during firing the first engine cylinder, skipping firing of a second engine cylinder;
determining a second air charge amount for the first engine cylinder based on engine operating conditions following the injection of the first fuel quantity and following opening of the intake valve of the first engine cylinder; and
injecting a second fuel quantity of the fuel to a third engine cylinder, the second fuel quantity based on the first fuel quantity and the determined second air charge amount for the first engine cylinder.

15. The method of claim 14, wherein the skip fire mode includes engine operation with at least one remaining cylinder of an engine deactivated.

16. The method of claim 14, wherein the transition into the skip fire mode includes where an engine transitions from firing all cylinders to firing only a subset of the cylinders of the engine and the injecting the first fuel quantity during the transition into the skip fire mode begins before skipping firing the second engine cylinder.

17. The method of claim 14, further comprising, during a transition out of the skip fire mode, where an engine transitions from firing only a subset of cylinders of the engine to firing all cylinders of the engine, continuing to adjust a fuel quantity injected into each cylinder based on an estimated air charge amount for a previously fired cylinder until all cylinders have been fired for an entire engine cycle.

18. The method of claim 14, wherein the first air charge amount is a predicted air charge amount for the first engine cylinder predicted prior to the intake valve of the first engine cylinder opening, and wherein the second air charge amount is a calculated air charge amount for the first engine cylinder calculated at a subsequent closing of the intake valve of the first engine cylinder.

19. The method of claim 18, wherein the second fuel quantity is further based on a third air charge amount predicted for the third engine cylinder and a second desired air-fuel ratio.

20. The method of claim 14, wherein the injecting of the first fuel quantity and the injecting of the second fuel quantity each occur via port injection.

21. A system, comprising:
an engine having a plurality of cylinders;
a port fuel injection system to port inject fuel to each cylinder of the plurality of cylinders;
a direct fuel injection system to direct inject fuel to each cylinder of the plurality of cylinders;
a spark ignition system to initiate combustion in each cylinder of the plurality of cylinders, including one or more ionization sensors to detect occurrence of combustion events in the plurality of cylinders; and
a controller including non-transitory instructions to:
determine a commanded firing order of the engine during a skip fire mode, where at least a first cylinder of the plurality of cylinders is scheduled to be fired and at least a second cylinder of the plurality of cylinders is scheduled to be skipped;
during a non-skip fire mode, only activating the port fuel injection system to port inject all fuel into each of the plurality of cylinders;
during a transition into the skip fire mode from the non-skip fire mode,
activate the port fuel injection system to port inject a first fuel quantity of a fuel to the first cylinder during a first, earlier portion of an engine cycle,
activate the direct fuel injection system to direct inject a second fuel quantity of the fuel to the first cylinder during a second, later portion of the engine cycle,
activate the spark ignition system to initiate combustion in the first cylinder, where the first fuel quantity is lean of a first desired air-fuel ratio for the first cylinder that is based on an estimated air charge amount for the first cylinder at a time prior to the port injection of the first fuel quantity, and the second fuel quantity brings an overall air-fuel ratio for the first cylinder to a second, desired air-fuel ratio for the first cylinder that is based on an updated air charge amount for the first cylinder, and
not activate the spark ignition system to not initiate combustion in the second cylinder, in order to skip firing the second cylinder, between port injecting the first fuel quantity and direct injecting the second fuel quantity to the first cylinder; and
after transitioning out of the skip fire mode to the non-skip fire mode, which includes firing all of the plurality of cylinders for an entire engine cycle, and during firing of the first cylinder, activating the port fuel injection system to port inject a third fuel quantity of the fuel to the first cylinder, where the third fuel quantity includes all fuel injected into the first cylinder.

22. The system of claim 21, wherein the controller includes further instructions to:
determine if combustion occurred in the first cylinder via feedback from the one or more ionization sensors;
if combustion does not occur in the first cylinder, adjust the commanded firing order to fire the second cylinder; and
if combustion does occur in the first cylinder, maintain the commanded firing order of the engine to skip the second cylinder.

23. The system of claim 22, wherein the commanded firing order of the engine is based on an original firing order of the engine in the non-skip fire mode, a number of cylinders to be skipped during the skip fire mode, and which cylinders of the plurality of cylinders were fired in a previous engine cycle, where the number of cylinders to be skipped is based on engine load.

* * * * *